US012632936B2

(12) United States Patent
Wang et al.

(10) Patent No.: US 12,632,936 B2
(45) Date of Patent: May 19, 2026

(54) METHOD OF HIGH-DYNAMIC-RANGE IMAGE DENOISING AND DEVICE

(71) Applicants: VERISILICON MICROELECTRONICS (SHANGHAI) CO., LTD., Shanghai (CN); VERISILICON TECHNOLOGY (SHANGHAI) CO., LTD., Shanghai (CN); VERISILICON MICROELECTRONICS (NANJING) CO., LTD., Nanjing (CN); VERISILICON MICROELECTRONICS (CHENGDU) CO., LTD., Chengdu (CN)

(72) Inventors: Simin Wang, Shanghai (CN); Guangzhe Ru, Shanghai (CN)

(73) Assignees: VERISILICON MICROELECTRONICS (SHANGHAI) CO., LTD., Shanghai (CN); VERISILICON TECHNOLOGY (SHANGHAI) CO., LTD., Shanghai (CN); VERISILICON MICROELECTRONICS (NANJING) CO., LTD., Nanjing (CN); VERISILICON MICROELECTRONICS (CHENGDU) CO., LTD., Chengdu (CN)

( * ) Notice: Subject to any disclaimer, the term of this patent is extended or adjusted under 35 U.S.C. 154(b) by 56 days.

(21) Appl. No.: 18/535,419

(22) Filed: Dec. 11, 2023

(65) Prior Publication Data

US 2024/0296529 A1     Sep. 5, 2024

Related U.S. Application Data

(63) Continuation-in-part of application No. PCT/CN2023/079644, filed on Mar. 3, 2023.

(51) Int. Cl.
*G06T 5/70* (2024.01)
*G06V 10/74* (2022.01)

(52) U.S. Cl.
CPC .............. *G06T 5/70* (2024.01); *G06V 10/761* (2022.01); *G06T 2207/10144* (2013.01); *G06T 2207/20182* (2013.01)

(58) Field of Classification Search
CPC ............. G06T 5/70; G06T 2207/10144; G06T 2207/20182; G06V 10/761
See application file for complete search history.

(56) References Cited

U.S. PATENT DOCUMENTS

| | | | |
|---|---|---|---|
| 7,652,788 B2 | 1/2010 | Foi et al. | |
| 2007/0297019 A1* | 12/2007 | Foi ........................... | G06T 5/70 358/463 |

(Continued)

FOREIGN PATENT DOCUMENTS

| | | |
|---|---|---|
| CN | 103973990 A | 8/2014 |
| CN | 105761216 A | 7/2016 |
| CN | 115049550 A | 9/2022 |

OTHER PUBLICATIONS

International Search Report and Written Opinion with regard to PCT/CN2023/079644 mailed Jun. 23, 2023.

(Continued)

*Primary Examiner* — Yassin Alata
(74) *Attorney, Agent, or Firm* — BCF LLP

(57) ABSTRACT

The present disclosure provides an image denoising method, a device, an electronic equipment, and computer-readable storage medium, wherein the method comprises performing a variance-stabilizing transform on the to-be-denoised image based on preset noise model parameters to obtain a first intermediate image; denoising the first intermediate image based on a preset signal-to-noise fluctuation curve and a preset denoising algorithm to obtain a second inter- (Continued)

A21
denoising each group of sample images separately to obtain each group of denoised sample images A22
determining, for each group of sample images, the noise variance of the group of sample images according to the group of sample images and their corresponding denoised sample images, and determining, according to the group of sample images and their corresponding noise variance, a first parameter and a second parameter which are corresponded to the group of sample images A23
determining a first hyperparameter and a second hyperparameter of the noise model according to the photosensibility of each group of sample images, the first parameter and the second parameter corresponding to each group of sample images A24
determining the noise model parameters based on the reference photosensibility of the to-be-denoised image, the first hyperparameter, and the second hyperparameter mediate image, wherein the signal-to-noise fluctuation curve is used to characterize differential information in the noise variance corresponding to the to-be-denoised image at different exposure gains; and performing a variance-stabilizing inverse transform on the second intermediate image based on the noise model parameters to obtain a denoised image.

18 Claims, 5 Drawing Sheets

(56)                    References Cited

U.S. PATENT DOCUMENTS

| | | | |
|---|---|---|---|
| 2018/0260937 A1* | 9/2018 | Gadi | G06T 3/4007 |
| 2019/0035058 A1 | 1/2019 | Strobel et al. | |
| 2019/0096038 A1* | 3/2019 | El-Khamy | G06T 5/60 |

OTHER PUBLICATIONS

Official Communication with regard to the EP Patent Application No. 23809944.4 issued Oct. 2, 2024.
European Search Report with regard to the EP Patent Application No. 23809944.4 issued Jun. 19, 2024.
Office Action with regard to the JP Patent Application No. 2023-550302 issued Jun. 10, 2025.
Office Action with regard to the KR Patent Application No. 10-2023-7042132 issued Mar. 18, 2025.
Decision to Grant with regard to the KR Patent Application No. 10-2023-7042132 issued Jun. 11, 2025.

* cited by examiner

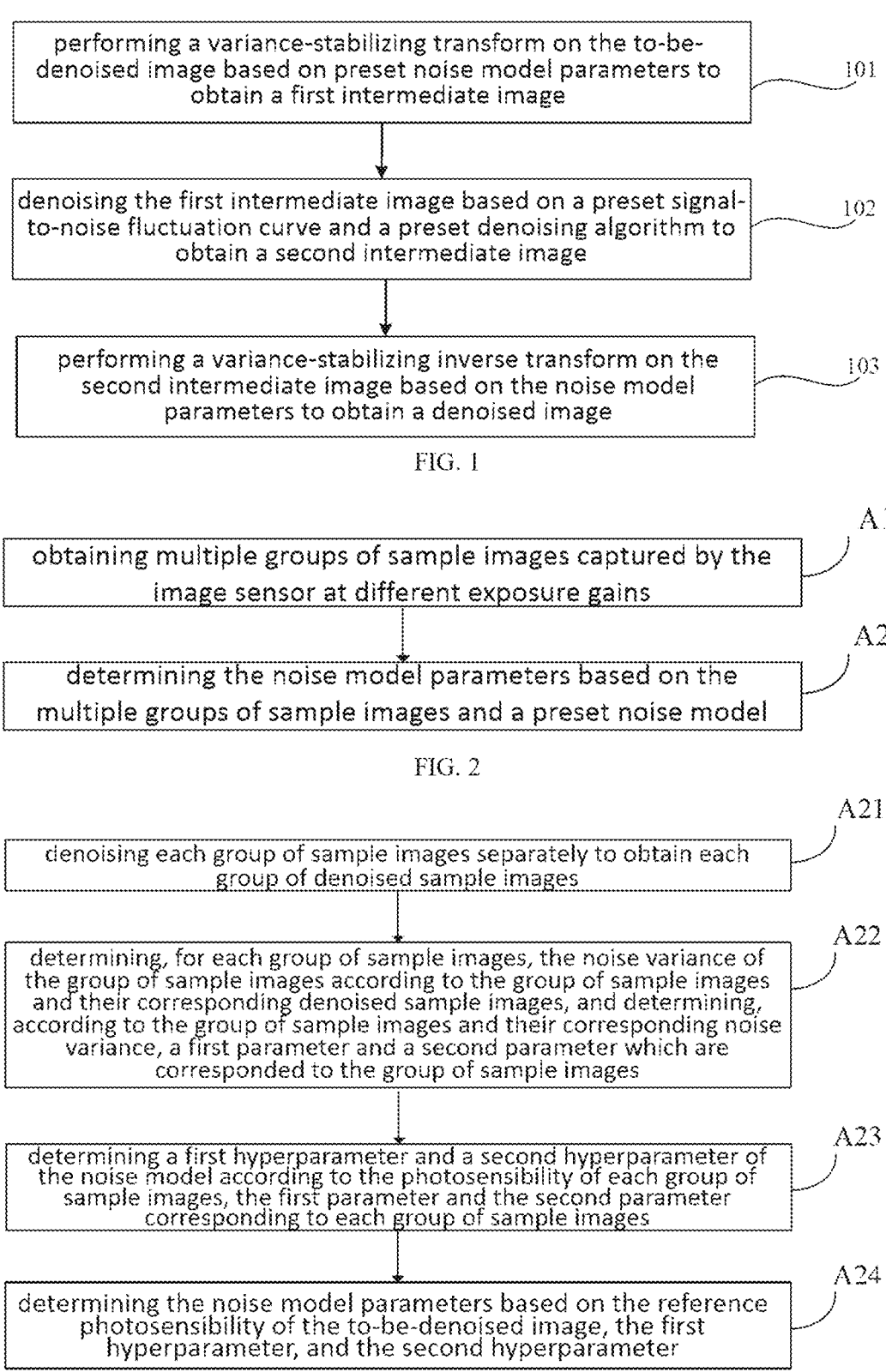

performing a variance-stabilizing transform on the to-be-denoised image based on preset noise model parameters to obtain a first intermediate image — 101 denoising the first intermediate image based on a preset signal-to-noise fluctuation curve and a preset denoising algorithm to obtain a second intermediate image — 102 performing a variance-stabilizing inverse transform on the second intermediate image based on the noise model parameters to obtain a denoised image — 103

FIG. 1 obtaining multiple groups of sample images captured by the image sensor at different exposure gains — A1 determining the noise model parameters based on the multiple groups of sample images and a preset noise model — A2

FIG. 2 denoising each group of sample images separately to obtain each group of denoised sample images — A21 determining, for each group of sample images, the noise variance of the group of sample images according to the group of sample images and their corresponding denoised sample images, and determining, according to the group of sample images and their corresponding noise variance, a first parameter and a second parameter which are corresponded to the group of sample images — A22 determining a first hyperparameter and a second hyperparameter of the noise model according to the photosensibility of each group of sample images, the first parameter and the second parameter corresponding to each group of sample images — A23 determining the noise model parameters based on the reference photosensibility of the to-be-denoised image, the first hyperparameter, and the second hyperparameter — A24

FIG. 3

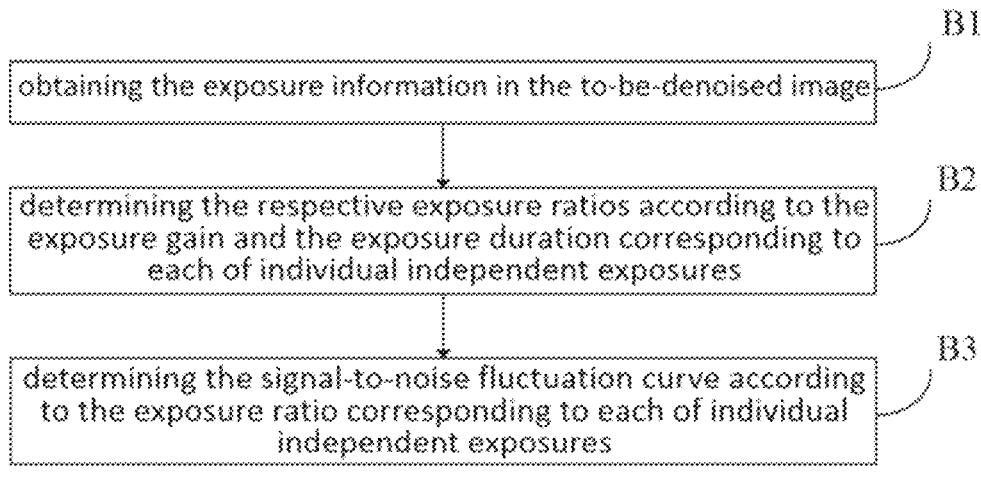

B1 obtaining the exposure information in the to-be-denoised image

B2 determining the respective exposure ratios according to the exposure gain and the exposure duration corresponding to each of individual independent exposures

B3 determining the signal-to-noise fluctuation curve according to the exposure ratio corresponding to each of individual independent exposures

FIG. 4

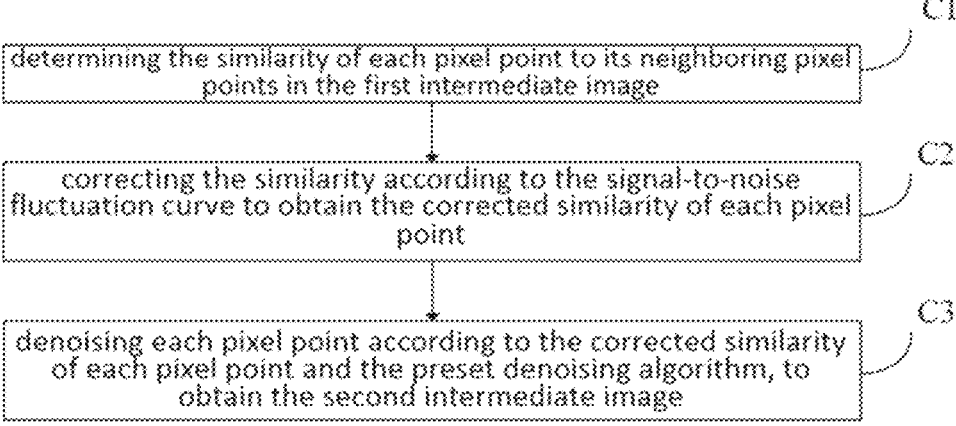

C1 determining the similarity of each pixel point to its neighboring pixel points in the first intermediate image

C2 correcting the similarity according to the signal-to-noise fluctuation curve to obtain the corrected similarity of each pixel point

C3 denoising each pixel point according to the corrected similarity of each pixel point and the preset denoising algorithm, to obtain the second intermediate image

FIG. 5

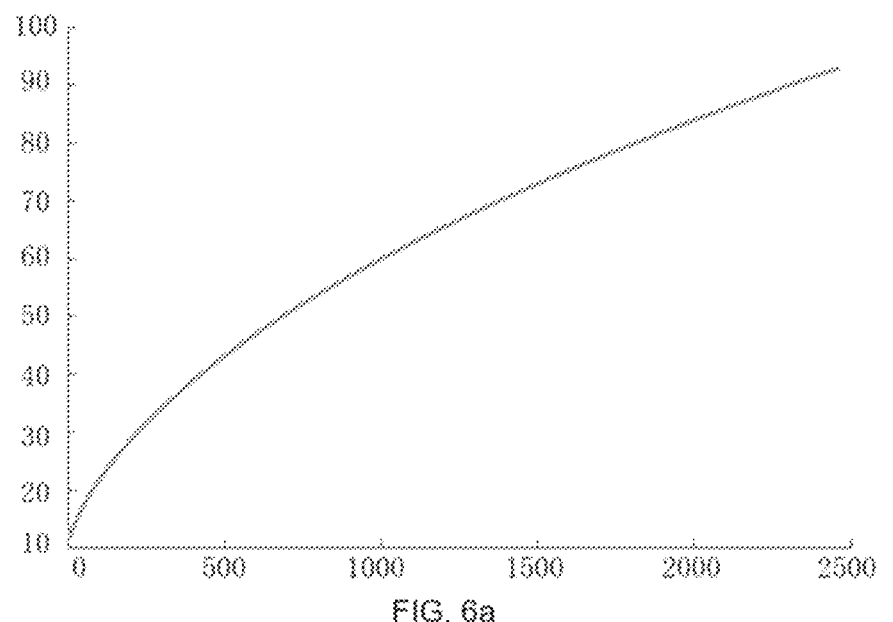

FIG. 6a

METHOD OF HIGH-DYNAMIC-RANGE IMAGE DENOISING AND DEVICE

TECHNICAL FIELD

The present disclosure relates to the field of image processing, in particular to an image denoising method, a device, an electronic equipment, and a computer-readable storage medium.

BACKGROUND ART

With the continuous development of smart driving technology, CMOS (complementary metal oxide semiconductor, CMOS for short) image sensor has emerged for in-vehicle application scenarios. CMOS image sensor captures high-dynamic-range images embedded with information from multiple exposures, which provides high sensitivity and high dynamic range. The dynamic range of images captured by a conventional image sensor is usually around 70 DB, while the dynamic range of images captured by a CMOS image sensor is able to reach more than 100 DB, or even 180 DB (which exceeds the human eye's ability to perceive the environment). CMOS image sensor has the advantage of being able to accurately reproduce the shape and color of traffic lights in highlight areas, and also retain details in dark areas in the environments with harsh lighting conditions. In order to recover the high-dynamic-range information in the images captured by CMOS image sensors, the image information output from the CMOS image sensor needs to be denoised in the image processing module, thereby improving the signal-to-noise ratio.

At current, when denoising the high-dynamic-range images, usually, a linear noise model is directly applied for the denoise processing. However, the noise features in high-dynamic-range images do not follow a linear model, which leads to the problem of uneven noise reduction and poor denoising effectiveness.

SUMMARY

The objective of embodiments of the present disclosure is to provide an image denoising method, a device, an electronic equipment, and a computer-readable storage medium to improve the effectiveness of noise reduction for high-dynamic-range images.

In the first aspect, the present disclosure provides an image denoising method, comprising: performing a variance-stabilizing transform on the to-be-denoised image based on preset noise model parameters to obtain a first intermediate image; denoising the first intermediate image based on a preset signal-to-noise fluctuation curve and a preset denoising algorithm to obtain a second intermediate image, wherein the signal-to-noise fluctuation curve is used to characterize differential information in the noise variance corresponding to the to-be-denoised image at different exposure gains; and performing a variance-stabilizing inverse transform on the second intermediate image based on the noise model parameters to obtain a denoised image.

In the embodiments of the present disclosure, by the above-mentioned manner, when denoising a high-dynamic-range image, the noise reduction is performed on the high-dynamic-range image based on the denoising algorithm and the signal-to-noise fluctuation curve that characterizes the differential information in the noise variance corresponding to the to-be-denoised image at different exposure gains. In the denoising process, it is ensured that the estimation for the noise variance distribution is accurate at each brightness (i.e., at different exposure gains), so as to improve the effectiveness of noise reduction. In addition, compared to the denoising method of splitting a high-dynamic-range image into multiple frames of low-dynamic-range images and respectively denoising the multiple frames of low-dynamic-range images and then reconstructing them into high-dynamic-range image, the image denoising method provided by the embodiment of the present disclosure can directly denoise the high-dynamic-range images, thereby avoiding the resource consumption caused by processing multiple frames of low-dynamic-range images.

In an optional embodiment, before the performing a variance-stabilizing transform on the to-be-denoised image based on preset noise model parameters to obtain a first intermediate image, the method further comprises obtaining multiple groups of sample images captured by the image sensor at different exposure gains, wherein the image sensor is the image sensor that captures the to-be-denoised image, and each group of sample images corresponds to one exposure gain; and determining the noise model parameters based on the multiple groups of sample images and a preset noise model.

In the embodiments of the present disclosure, by capturing multiple groups of sample images at different exposure gains using the image sensor that captures the to-be-denoised images and determining the noise model parameters based on the multiple groups of sample images by fitting, it avoids the deviation of noise model parameters due to different image sensor types and thus improves the effectiveness of subsequent noise reduction for the to-be-denoised image.

In an optional embodiment, the multiple groups of sample images are obtained by using the image sensor with different exposure gains to photograph gray plates in a preset environment.

In an optional embodiment, the step of determining the noise model parameters based on the multiple groups of sample images and a preset noise model comprises denoising each group of sample images separately to obtain each group of denoised sample images; determining, for each group of sample images, the noise variance of the group of sample images according to the group of sample images and their corresponding denoised sample images, and determining, according to the group of sample images and their corresponding noise variance, a first parameter and a second parameter which are corresponded to the group of sample images; determining a first hyperparameter and a second hyperparameter of the noise model according to the photosensibility of each group of sample images, the first parameter and the second parameter corresponding to each group of sample images; and determining the noise model parameters based on the reference photosensibility of the to-be-denoised image, the first hyperparameter, and the second hyperparameter.

In the embodiment of the present disclosure, the first parameter and the second parameter corresponding to the multiple groups of sample images are first determined by each group of sample images and their corresponding noise variances, and then the first hyperparameter and the second hyperparameter of the noise model are determined based on the photosensibility of each group of sample images and their corresponding first parameter and second parameter. The first hyperparameter and the second hyperparameter correspondingly determine the functional relationship between the photosensibility, the first parameter, and the second parameter. Further, when the image sensor is applied to acquire the to-be-denoised image, the noise model parameters corresponding to the to-be-denoised image are determined by combining the reference photosensibility, the first hyperparameter, and the second hyperparameter that are corresponded to the to-be-denoised image. The above approach enables the determined noise model parameters to match better with the to-be-denoised image.

In an optional embodiment, the reference photosensibility of the to-be-denoised image is the photosensibility corresponding to the longest exposure frame in the to-be-denoised image.

In the embodiment of the present disclosure, there are multiple independent exposures with different exposure gains in the high-dynamic-range image, wherein the longest exposure frame is the exposure frame with the longest exposure time, which has the best signal-to-noise ratio. By applying the photosensibility that corresponds to the longest exposure frame in the to-be-denoised image as the reference photosensibility, the noise model parameters are determined according to the reference photosensibility to improve the denoising effectiveness when the image denoising is subsequently performed.

In an optional embodiment, before the denoising the first intermediate image based on a preset signal-to-noise fluctuation curve and a preset denoising algorithm to obtain a second intermediate image, the method further comprises obtaining exposure information in the to-be-denoised image, wherein the exposure information comprises the exposure gain and the exposure duration that correspond to each of multiple independent exposures; determining the respective exposure ratios according to the exposure gain and the exposure duration corresponding to each of individual independent exposures; and determining the signal-to-noise fluctuation curve according to the exposure ratio corresponding to each of individual independent exposures.

In the embodiment of the present disclosure, the signal-to-noise fluctuation curve is determined by analyzing the exposure ratio corresponding to each of individual independent exposures in the to-be-denoised image. When subsequently denoising the to-be-denoised image by combining the signal-to-noise fluctuation curve and the preset denoising algorithm, it can effectively ensure that the estimation for noise variance distribution is accurate under different exposure gains. Thus, the denoised images are able to maintain the details on each brightness, so as to improve the denoising effectiveness.

In an optional embodiment, the step of determining the respective exposure ratios according to the exposure gain and the exposure duration corresponding to each of individual independent exposures comprises determining the exposure ratio corresponding to each independent exposure based on the formula: $Ratio_i = (exp_i \times gain_i)/(EXP \times GAIN)$, where $Ratio_i$ is the exposure ratio corresponding to the ith independent exposure; $exp_i$ is the exposure duration corresponding to the ith independent exposure; $gain_i$ is the exposure gain corresponding to the ith independent exposure; EXP is the exposure time for the reference exposure; and GAIN is the exposure gain corresponding to the reference exposure.

In an optional embodiment, the step of denoising the first intermediate image based on a preset signal-to-noise fluctuation curve and a preset denoising algorithm to obtain a second intermediate image comprises determining the similarity of each pixel point to its neighboring pixel points in the first intermediate image; correcting the similarity according to the signal-to-noise fluctuation curve to obtain the corrected similarity of each pixel point; and denoising each pixel point according to the corrected similarity of each pixel point and the preset denoising algorithm, to obtain the second intermediate image.

In a second aspect, the present disclosure provides an image denoising device, wherein the device comprises a first determination module, configured for performing a variance-stabilizing transform on the to-be-denoised image based on preset noise model parameters to obtain a first intermediate image; a second determination module, configured for denoising the first intermediate image based on a preset signal-to-noise fluctuation curve and a preset denoising algorithm to obtain a second intermediate image, wherein the signal-to-noise fluctuation curve is used to characterize differential information in the noise variance corresponding to the to-be-denoised image at different exposure gains; and a third determination module, configured for performing a variance-stabilizing inverse transform on the second intermediate image based on the noise model parameters to obtain a denoised image.

In an optional embodiment, the device further comprises a fourth determination module, configured for obtaining multiple groups of sample images captured by the image sensor at different exposure gains, wherein the image sensor is the image sensor that captures the to-be-denoised image, and each group of sample images corresponds to one exposure gain; and determining the noise model parameters based on the multiple groups of sample images and a preset noise model.

In an optional embodiment, the multiple groups of sample images are obtained by using the image sensor with different exposure gains to photograph gray plates in a preset environment.

In an optional embodiment, the fourth determination module is specifically configured for denoising each group of sample images separately to obtain each group of denoised sample images; determining, for each group of sample images, the noise variance of the group of sample images according to the group of sample images and their corresponding denoised sample images, and determining, according to the group of sample images and their corresponding noise variance, a first parameter and a second parameter which are corresponded to the group of sample images; determining a first hyperparameter and a second hyperparameter of the noise model according to the photosensibility of each group of sample images, the first parameter and the second parameter corresponding to each group of sample images; and determining the noise model parameters based on the reference photosensibility of the to-be-denoised image, the first hyperparameter, and the second hyperparameter.

In an optional embodiment, the reference photosensibility of the to-be-denoised image is the photosensibility corresponding to the longest exposure frame in the to-be-denoised image.

In an optional embodiment, the device further comprises a fifth determination module, configured for obtaining exposure information in the to-be-denoised image, wherein the exposure information comprises the exposure gain and the exposure duration that correspond to each of multiple independent exposures; determining the respective exposure ratios according to the exposure gain and the exposure duration corresponding to each of individual independent exposures; and determining the signal-to-noise fluctuation curve according to the exposure ratio corresponding to each of individual independent exposures.

In an optional embodiment, the fifth determination module is specifically configured for determining the exposure ratio corresponding to each independent exposure based on the formula: $Ratio_i=(exp_i \times gain_i)/(EXP \times GAIN)$, wherein $Ratio_i$ is the exposure ratio corresponding to the ith independent exposure; $exp_i$ is the exposure duration corresponding to the ith independent exposure; $gain_i$ is the exposure gain corresponding to the ith independent exposure; EXP is the exposure time for the reference exposure; and GAIN is the exposure gain corresponding to the reference exposure.

In an optional embodiment, the second determination module is specifically configured for determining the similarity of each pixel point to its neighboring pixel points in the first intermediate image; correcting the similarity according to the signal-to-noise fluctuation curve to obtain the corrected similarity of each pixel point; and denoising each pixel point according to the corrected similarity of each pixel point and the preset denoising algorithm, to obtain the second intermediate image.

In a third aspect, the present disclosure provides electronic equipment, comprising a processor and a memory, wherein the memory stores program instructions executable by the processor, and the processor calls the program instructions, which is capable of executing the method as described in any one of the preceding embodiments.

In a fourth aspect, the present disclosure provides a computer-readable storage medium, wherein the computer-readable storage medium is stored with computer program instructions thereon. The computer program instructions, when read and run by a computer, performs the method as described in any one of the preceding embodiments.

BRIEF DESCRIPTION OF DRAWINGS

In order to more clearly illustrate the technical solutions of the embodiments of the present disclosure, the following will briefly introduce the accompanying drawings used in the embodiments of the present application. It should be understood that the following drawings only show some embodiments of the present disclosure, and therefore should not be regarded as a limitation on the scope. Those ordinarily skilled in the art can also obtain other related drawings based on these drawings without inventive effort.

FIG. 1 is a flow chart of an image denoising method provided by the embodiment of the present disclosure;

FIG. 2 is a flow chart of the determination of the noise model parameters provided by the embodiment of the present disclosure;

FIG. 3 is a flow chart of the specific implementation of step A2 provided by the embodiment of the present disclosure;

FIG. 4 is a flow chart of determination of the signal-to-noise fluctuation curve provided by the embodiment of the present disclosure;

FIG. 5 is a flow chart of the determination of the second intermediate image provided by the embodiment of the present disclosure;

FIGS. 6a-6d are schematic views of the noise distribution determined by the image denoising method provided by the embodiment of the present disclosure;

DETAILED DESCRIPTION OF EMBODIMENTS

Figure 6B:
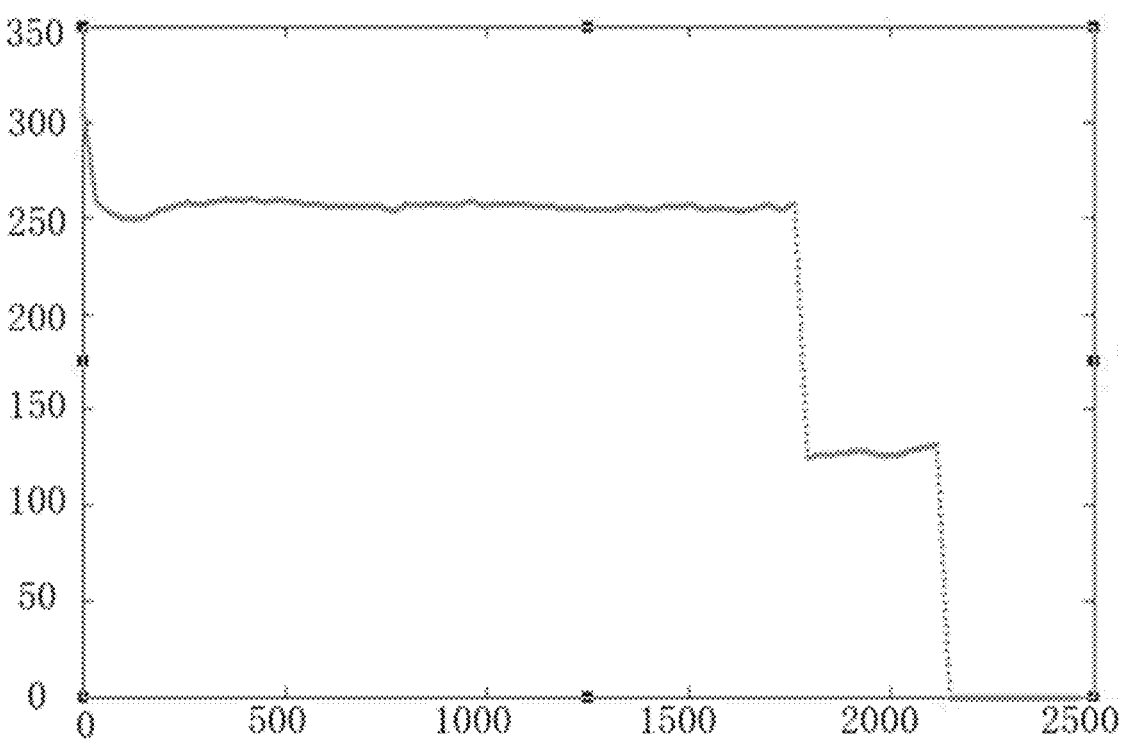

The technical solutions in the embodiments of the present disclosure will be described below with reference to the drawings in the embodiments of the present disclosure.

The objective of embodiments of the present disclosure is to provide an image denoising method, a device, an electronic equipment, and a computer readable storage medium, so as to improve the effectiveness of noise reduction for high-dynamic-range images.

Referring to FIG. 1, FIG. 1 is a flow chart of an image denoising method provided by the embodiment of the present disclosure, wherein the image denoising method may include the following steps:

Step 101: performing a variance-stabilizing transform on the to-be-denoised image based on preset noise model parameters to obtain a first intermediate image;

Step 102: denoising the first intermediate image based on a preset signal-to-noise fluctuation curve and a preset denoising algorithm to obtain a second intermediate image; and Step 103: performing a variance-stabilizing inverse transform on the second intermediate image based on the noise model parameters to obtain a denoised image.

In the embodiment of the present disclosure, the to-be-denoised image can be a high-dynamic-range image. The signal-to-noise fluctuation curve characterizes differential information in the noise variance corresponding to the to-be-denoised image at different exposure gains. Since the range of the high-dynamic-range image is embedded with brightness information at a plurality of different exposure gains, thus introducing noise at different exposure gains. If using only the preset denoising algorithm for noise reduction, the problem of uneven noise reduction will happen. Hence, the denoising processing is performed on the first intermediate image, wherein the denoising processing is performed on the first intermediate image in combination with the signal-to-noise fluctuation curve and the denoising algorithm, thereby improving the accuracy of noise reduction. Finally, the second intermediate image obtained after denoising is subjected to a variance-stabilizing inverse transform, which restores the second intermediate image from the variance-stabilized nonlinear region to the linear region, thereby obtaining the denoised image.

In the above-mentioned manner, when denoising a high-dynamic-range image, the noise reduction is performed on the high-dynamic-range image based on the denoising algorithm and the signal-to-noise fluctuation curve that characterizes the differential information in the noise variance corresponding to the to-be-denoised image at different exposure gains. In the denoising process, it is ensured that the estimation for the noise variance distribution is accurate at each brightness (i.e., at different exposure gains), which improves the effectiveness of noise reduction. In addition, compared to the denoising method of splitting a high-dynamic-range image into multiple frames of low-dynamic-range images and respectively denoising the multiple frames of low-dynamic-range images and then reconstructing them into high-dynamic-range image, the image denoising method provided by the embodiment of the present disclosure directly denoises the high-dynamic-range images, thereby avoiding the resource consumption caused by processing multiple frames of low-dynamic-range images.

The above steps are described in detail below.

Step 101: performing a variance-stabilizing transform on the to-be-denoised image based on preset noise model parameters to obtain a first intermediate image.

In the embodiment of the present disclosure, firstly, the variance-stabilizing transform is performed on the to-be-denoised image according to the preset noise model parameters, and the to-be-denoised image is transformed from the linear region to the variance-stabilized nonlinear region, so as to obtain the first intermediate image for subsequent image denoising processing.

Specifically, the preset noise model can be a Poisson-Gaussian noise model. Based on the noise model parameters in the Poisson-Gaussian noise model, a variance-stabilizing transform is performed on the to-be-denoised image to determine the first intermediate image. The variance-stabilizing transform of the to-be-denoised image can be determined by the following formula:

$$y = \frac{2}{a} \times \sqrt{\max\left(0, a \times v + \frac{3}{8} \times a^2 + b\right)}$$

where y is each pixel value in the first intermediate image, v is each pixel value in the to-be-denoised image, and a and b are noise model parameters.

It can be understood that the image denoising method provided in the embodiment of the present disclosure can be applied to an image denoising device. The image denoising device is pre-configured with noise model parameters; and when the to-be-denoised image is input to the image denoising device, the image denoising device directly performs the above-mentioned processing on the to-be-denoised image according to the noise model parameters to obtain the first intermediate image.

The following describes how the noise model parameters are determined.

Referring to FIG. 2, prior to step 101, the image denoising method provided by embodiments of the present disclosure can include the following steps:

A1: obtaining multiple groups of sample images captured by the image sensor at different exposure gains; and A2: determining the noise model parameters based on the multiple groups of sample images and a preset noise model.

In the embodiment of the present disclosure, in order to improve the accuracy of the noise model parameters, the image sensor for collecting multiple groups of sample images at different exposure gains and the image sensor for collecting the to-be-denoised images are the same image sensor.

Specifically, the multiple groups of sample images are obtained by using the image sensor with different exposure gains to photograph gray plates in a preset environment.

The following describes how to acquire multiple groups of sample images in conjunction with a specific example:

(1) arranging one uniform gray plate with a length of 1.5 meters and a width of 1 meter in the standard laboratory, wherein the viewing plane of the image sensor is parallel to the gray plate, ensuring that the field of view is covered by the gray plate and that the field angle covers 80% of the area of the gray plate;

(2) arranging one flat-plate light source at a distance of 1-2 meters from the flat plate, which is parallel to the gray plate;

(3) turning on the automatic exposure module in the image sensor and adjusting the brightness of the flat-plate light source so that the exposure gain of the automatic exposure module is equal to 1 fold;

(4) shooting continuously 20-50 frames of gray plate images to obtain a group of sample images with an exposure gain of 1 fold; and (5) returning to step (3), shooting sample images with different exposure gains, such as exposure gains of 2 fold, 4 fold, 8 fold, 16 fold, etc., by adjusting the brightness of the flat-plate light source, so as to obtain the multiple groups of sample images.

It should be noted that, in the above step (3), the brightness of the flat-plate light source is adjusted, and the automatic exposure module makes the exposure gain of the automatic exposure module be 1 fold by the auto exposure control (AEC) algorithm. In addition, the auto exposure control algorithm is configured to ensure that the sample images output by the image sensor have a moderate brightness range. For example, when the image sensor uses 8 bit to represent brightness, the auto exposure control algorithm is configured to ensure that the brightness range of the sample image output from the image sensor is around 100, 128, and 130.

The above examples are only one of the examples provided by the embodiments of the present disclosure. The embodiments of the present disclosure do not specifically limit the size of the gray plate or the coverage of the field angle.

After obtaining multiple groups of sample images, the noise model parameters are determined based on the multiple groups of sample images and the predetermined noise model.

As an optional embodiment, referring to FIG. 3, step A2 can include the steps of:

A21: denoising each group of sample images separately to obtain each group of denoised sample images;

A22: determining, for each group of sample images, the noise variance of the group of sample images according to the group of sample images and their corresponding denoised sample images, and determining, according to the group of sample images and their corresponding noise variance, a first parameter and a second parameter which are corresponded to the group of sample images;

A23: determining a first hyperparameter and a second hyperparameter of the noise model according to the photosensibility of each group of sample images, the first parameter and the second parameter corresponding to each group of sample images; and A24: determining the noise model parameters based on the reference photosensibility of the to-be-denoised image, the first hyperparameter, and the second hyperparameter.

In the embodiment of the present disclosure, noise reduction is first applied to one group of sample image data at each exposure gain. Specifically, each group of sample images after denoising can be obtained via frame matching and time domain superposition. The noise variance is then determined according to the difference between the sample images and their corresponding each group of sample images after denoising.

As an example, the noise model is a Poisson-Gaussian noise model, and the Poisson-Gaussian noise model can be expressed as:

$$var^2 = a * \text{luma} + b$$

wherein $var^2$ is the noise variance, luma is the brightness information of the sample image, a is the first parameter, and b is the second parameter. After determining the noise variance based on the difference between each group of sample images and their corresponding each group of denoised sample images, multiple groups of noise variance can be obtained. The multiple groups of first and second parameters can be obtained by substituting each group of noise variance and the brightness information of the sample images into the above formula.

Each group of sample images corresponds to one photosensibility. There is a linear relationship between the photosensibility and the first parameter a, which means that the following equation is satisfied:

$$a = k \times ISO$$

wherein k is the first hyperparameter, and ISO is the photosensibility.

There is a linear relationship between the photosensibility and the square of the second parameter b, which means that the following equation is satisfied:

$$b = p \times ISO \times ISO$$

wherein p is a second hyperparameter, and ISO is the photosensibility.

Therefore, the first hyperparameter and the second hyperparameter can be determined by substituting the photosensibility of each group of sample images, the first parameter, and the second parameter corresponding to each group of sample images into the above two equations.

After determining the first hyperparameter and the second hyperparameter, when it is necessary to determine the noise model parameters a and b in the to-be-denoised image, by substituting the reference photosensibility of the to-be-denoised image, the first hyperparameter and the second hyperparameter into the above two equations, the noise model parameters a and b in the to-be-denoised image can be calculated.

In some embodiments, the reference photosensibility is the photosensibility corresponding to the longest exposed frame in the to-be-denoised image. There are multiple independent exposures with different exposure gains in the high-dynamic-range image, wherein the longest exposure frame is the exposure frame with the longest exposure time, which has the best signal-to-noise ratio. By applying the photosensibility that corresponds to the longest exposure frame in the to-be-denoised image as the reference photosensibility, the noise model parameters are determined according to the reference photosensibility to improve the denoising effectiveness when the image denoising is subsequently performed.

Step 102: denoising the first intermediate image based on a preset signal-to-noise fluctuation curve and a preset denoising algorithm to obtain a second intermediate image.

In the embodiment of the present disclosure, the preset denoising algorithm can be a denoising algorithm that follows a Gaussian distribution, for example, non-local mean filtering algorithm, median filtering algorithm, Gaussian filtering algorithm, etc., which is not specifically limited to the present disclosure.

The signal-to-noise fluctuation curve is determined based on the characteristics of the image sensor from which the to-be-denoised image is captured. In some embodiments, for a particular image sensor, the signal-to-noise fluctuation curve is able to be pre-configured in the image denoising device.

In some other embodiments, referring to FIG. 4, prior to step 102, the signal-to-noise fluctuation curve can be determined in the following manner:

B1: obtaining the exposure information in the to-be-denoised image;

B2: determining the respective exposure ratios according to the exposure gain and the exposure duration corresponding to each of individual independent exposures; and B3: determining the signal-to-noise fluctuation curve according to the exposure ratio corresponding to each of individual independent exposures.

In the embodiment of the present disclosure, there are multiple independent exposures with different exposure gains in the to-be-denoised image, and the exposure information in the to-be-denoised image comprises the exposure gain and the exposure duration corresponding to each of the multiple independent exposures. The exposure gains and the exposure durations corresponding to individual independent exposures are pre-configured by the image sensor before the collection of the to-be-denoised image. When determining the signal-to-noise fluctuation curve, the configuration parameters in the image sensor can be directly obtained to determine the exposure gain and the exposure duration corresponding to each of individual independent exposures in the to-be-denoised image.

Specifically, the exposure ratio corresponding to each independent exposure can be determined by the following formula:

$$Ratio_i = (exp_i \times gain_i)/(EXP \times GAIN)$$

where $Ratio_i$ is the exposure ratio corresponding to the ith independent exposure, $exp_i$ is the exposure duration corresponding to the ith independent exposure, $gain_i$ is the exposure gain corresponding to the ith independent exposure, EXP is the exposure duration of the reference exposure, GAIN is the exposure gain corresponding to the reference exposure.

In some embodiments, it is known from the previous description that the signal-to-noise ratio of the longest exposure frame is the best. Therefore, the exposure duration corresponding to the longest exposure frame is used as the exposure duration of the reference exposure, and the exposure gain corresponding to the longest exposure frame is used as the exposure gain corresponding to the reference exposure.

In step B3 above, after determining the exposure ratio corresponding to each independent exposure, the square root of the exposure ratio corresponding to each independent exposure is calculated, and the signal-to-noise fluctuation curve is determined based on the square root of the exposure ratio of each independent exposure.

Specifically, the exposure ratio corresponding to the 1st independent exposure is $Ratio_1$, then the 1st independent exposure on the signal-to-noise fluctuation curve takes the value F1 as $F1 = \sqrt{Ratio_1}$. Similarly, the exposure ratio corresponding to the 2nd independent exposure is $Ratio_2$, then the 2nd independent exposure on the signal-to-noise fluctuation curve takes the value F2 as $F2 = \sqrt{Ratio_2}$. And so on, the value of each independent exposure on the signal-to-noise fluctuation curve is determined, thus determining the signal-to-noise fluctuation curve.

Further, referring to FIG. 5, the above step 102 can comprise the steps of:

C1: determining the similarity of each pixel point to its neighboring pixel points in the first intermediate image;

C2: correcting the similarity according to the signal-to-noise fluctuation curve to obtain the corrected similarity of each pixel point; and C3: denoising each pixel point according to the corrected similarity of each pixel point and the preset denoising algorithm, to obtain the second intermediate image.

It is understood that the process is the same for each pixel point in the first intermediate image. For the sake of convenient illustration, the following is to illustrate the specific treatment process of the above steps C1-C3 by taking one pixel point A in the first intermediate image and the preset denoising algorithm as a non-local mean filtering algorithm as an example.

In step C1, a plurality of pixel points around pixel point A is identified as one pixel block, and a similarity D between the pixel block corresponding to pixel point A and the neighboring plurality of pixel blocks is calculated. The similarity D can be the mean value of the absolute value difference between the pixel block corresponding to pixel point A and the neighboring plurality of pixel blocks, or the Euclidean distance between the pixel block corresponding to pixel point A and the neighboring plurality of pixel blocks.

For example, an 8×8 pixel block around pixel point A is taken as a representation of pixel point A, and the pixel values of all pixel points within this pixel block form a 64-dimensional vector. In a 16×16 window centered on pixel point A, there are 80 neighboring pixel blocks in addition to the 8×8 pixel block around pixel point A mentioned above. Each pixel block can be written as a 64-dimensional vector $q_i$, with i taken from 1 to 80, corresponding to these 80 neighboring pixel blocks.

When the mean value of the absolute value difference is used as the similarity between the pixel block corresponding to pixel point A and multiple neighboring pixel blocks, the similarity $D_i$ can be expressed as $$D = \frac{1}{N} \times |u - q_i|,$$

wherein N is the number of neighboring pixel blocks near pixel point A.

When the Euclidean distance is used as the similarity between the pixel block corresponding to pixel point A and multiple neighboring pixel blocks, the similarity $D_i$ can be expressed as $$D = \frac{1}{N} \times |u - q_i|^2,$$

wherein N is the number of neighboring pixel blocks near pixel point A.

In step C2, the value F of the independent exposure corresponding to pixel point A on the signal-to-noise fluctuation curve is determined based on the exposure gain corresponding to the pixel point. The corrected similarity D' is then determined according to the following formula:

$$D' = D \times F.$$

In step C3, after determining the modified similarity D' corresponding to the pixel point A, noise reduction is applied to each pixel point according to D' and the non-local mean filtering algorithm to obtain the second intermediate image. Understandably, the specific process of denoising by the non-local mean filtering algorithm is not described here.

Step 103: performing a variance-stabilizing inverse transform on the second intermediate image based on the noise model parameters to obtain a denoised image.

In the embodiment of the present disclosure, the obtained second intermediate image is in the non-linear region, according to steps 101-102. Consequently, the second intermediate image, which is in the non-linear region, is converted back to the linear region according to the noise model parameters, so as to obtain the denoised image.

Specifically, the variance-stabilizing inverse transform of the second intermediate image can be determined by the following formula:

$$v' = \text{clip}\left[ a \times \max \left( 0, \frac{(y'^2)}{4} + \frac{\sqrt{1.5}}{4 \times y'} - \frac{11}{8 \times y'^2} + \frac{5\sqrt{1.5}}{8 \times y'^2} - \frac{1}{8} - \frac{b}{a^2} \right), 0.4095 \right]$$

where y' is each pixel value in the second intermediate image, v' is each pixel value in the denoised image, and a and b are noise model parameters.

Figure 6C:
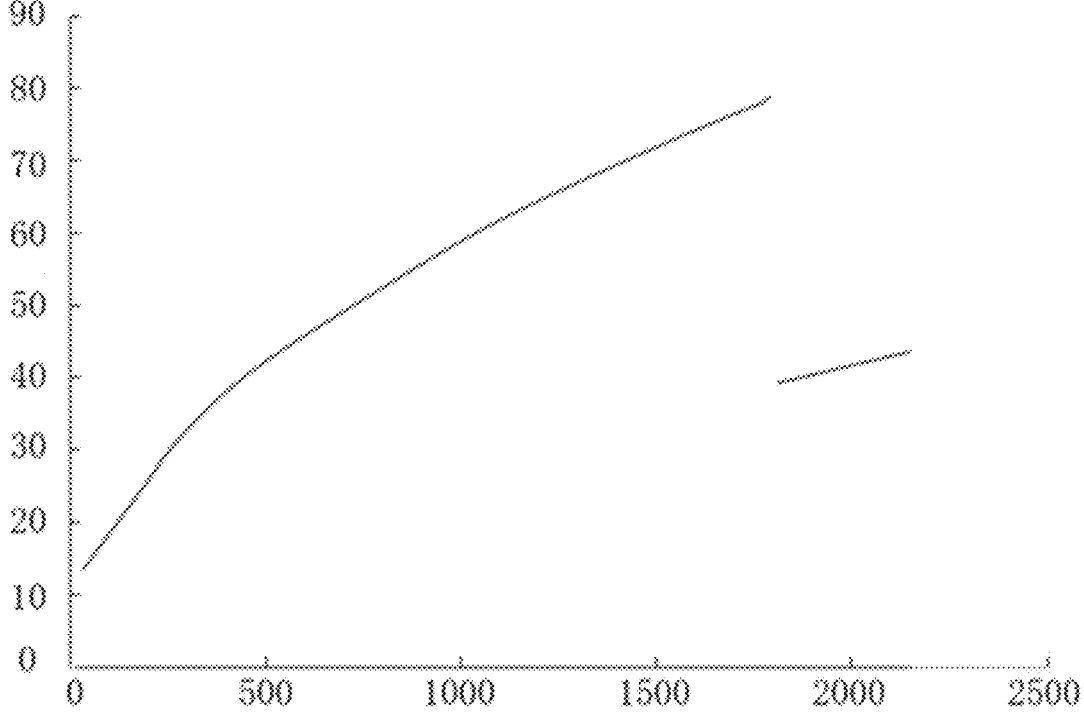
Figure 6D:
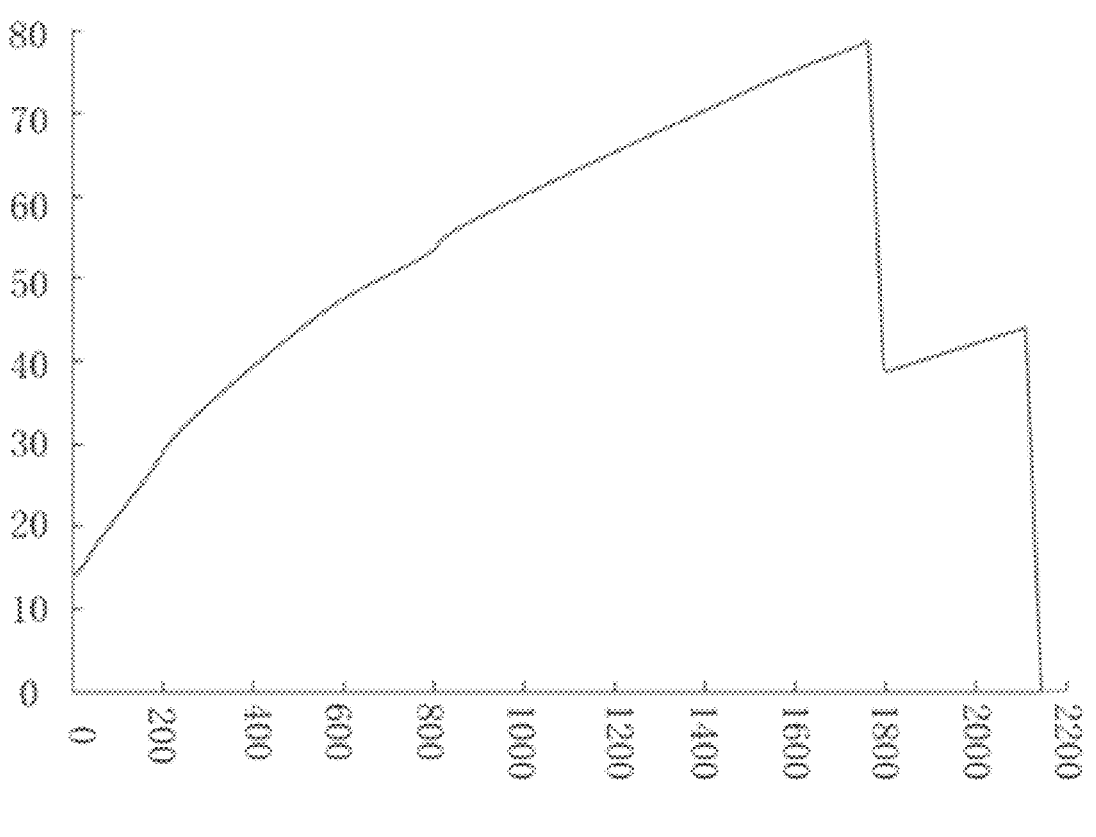

Referring to FIGS. 6a-6d, FIG. 6a shows the image linear noise model curve of the to-be-denoised image, FIG. 6b shows the signal-to-noise fluctuation curve, FIG. 6c shows the real noise distribution of the to-be-denoised image, and FIG. 6d shows the noise distribution obtained by combining the image linear noise model curve of the to-be-denoised image corresponding to FIG. 6a and the signal-to-noise fluctuation curve corresponding to FIG. 6b. By comparing FIG. 6c and FIG. 6d, it can be seen that the noise distribution obtained by combining the image linear noise model curve of the to-be-denoised image and the signal-to-noise fluctuation curve is very close to the real noise distribution of the to-be-denoised image, thus indicating that the denoising effectiveness can be improved by using the image denoising method provided by the embodiment of the present disclosure.

Figure 7:
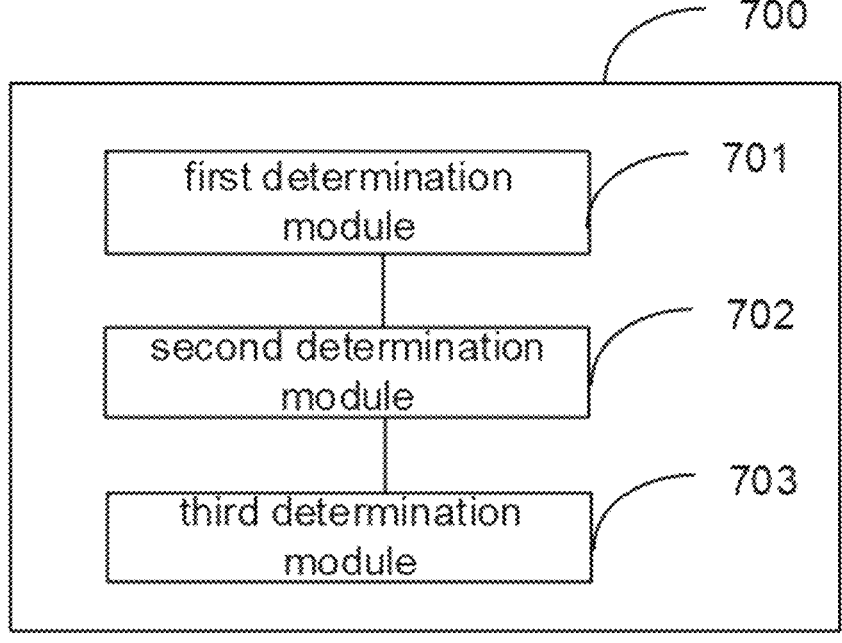
FIG. 7 is a block diagram of the structure of an image denoising device provided by the embodiment of the present disclosure.

Based on the same inventive idea, referring to FIG. 7, FIG. 7 is a block diagram of the structure of an image denoising device provided by the embodiment of the present disclosure, wherein the image denoising device 700 can comprise:

a first determination module 701, configured for performing a variance-stabilizing transform on the to-be-denoised image based on preset noise model parameters to obtain a first intermediate image;

a second determination module 702, configured for denoising the first intermediate image based on a preset signal-to-noise fluctuation curve and a preset denoising algorithm to obtain a second intermediate image, wherein the signal-to-noise fluctuation curve is used to characterize differential information in the noise variance corresponding to the to-be-denoised image at different exposure gains; and a third determination module 703, configured for performing a variance-stabilizing inverse transform on the second intermediate image based on the noise model parameters to obtain a denoised image.

In an optional embodiment, the device further comprises a fourth determination module, configured for obtaining multiple groups of sample images captured by the image sensor at different exposure gains, wherein the image sensor is the image sensor that captures the to-be-denoised image, and each group of sample images corresponds to one exposure gain; and determining the noise model parameters based on the multiple groups of sample images and a preset noise model.

In an optional embodiment, the multiple groups of sample images are obtained by using the image sensor with different exposure gains to photograph gray plates in a preset environment.

In an optional embodiment, the fourth determination module is specifically configured for denoising each group of sample images separately to obtain each group of denoised sample images; determining, for each group of sample images, the noise variance of the group of sample images according to the group of sample images and their corresponding denoised sample images, and determining, according to the group of sample images and their corresponding noise variance, a first parameter and a second parameter which are corresponded to the group of sample images; determining a first hyperparameter and a second hyperparameter of the noise model according to the photosensibility of each group of sample images, the first parameter and the second parameter corresponding to each group of sample images; and determining the noise model parameters based on the reference photosensibility of the to-be-denoised image, the first hyperparameter, and the second hyperparameter.

In an optional embodiment, the reference photosensibility of the to-be-denoised image is the photosensibility corresponding to the longest exposure frame in the to-be-denoised image.

In an optional embodiment, the device further comprises a fifth determination module, configured for obtaining exposure information in the to-be-denoised image, wherein the exposure information comprises the exposure gain and the exposure duration that correspond to each of multiple independent exposures; determining the respective exposure ratios according to the exposure gain and the exposure duration corresponding to each of individual independent exposures; determining the signal-to-noise fluctuation curve according to the exposure ratio corresponding to each of individual independent exposures.

In an optional embodiment, the fifth determination module is specifically configured for determining the exposure ratio corresponding to each independent exposure based on the formula: $Ratio_i=(exp_i \times gain_i)/(EXP \times GAIN)$, where $Ratio_i$ is the exposure ratio corresponding to the ith independent exposure; $exp_i$ is the exposure duration corresponding to the ith independent exposure; $gain_i$ is the exposure gain corresponding to the ith independent exposure; EXP is the exposure time for the reference exposure; and GAIN is the exposure gain corresponding to the reference exposure.

In an optional embodiment, the second determination module 702 is specifically configured for determining the similarity of each pixel point to its neighboring pixel points in the first intermediate image; correcting the similarity according to the signal-to-noise fluctuation curve to obtain the corrected similarity of each pixel point; and denoising each pixel point according to the corrected similarity of each pixel point and the preset denoising algorithm, to obtain the second intermediate image.

The image denoising device 700 corresponds to the aforementioned image denoising method, and each function module corresponds to each step of the aforementioned image denoising method. Therefore, the implementation of each function module is referred to the implementation of the image denoising method in the aforementioned embodiment, and will not be repeatedly introduced here.

Figure 8:
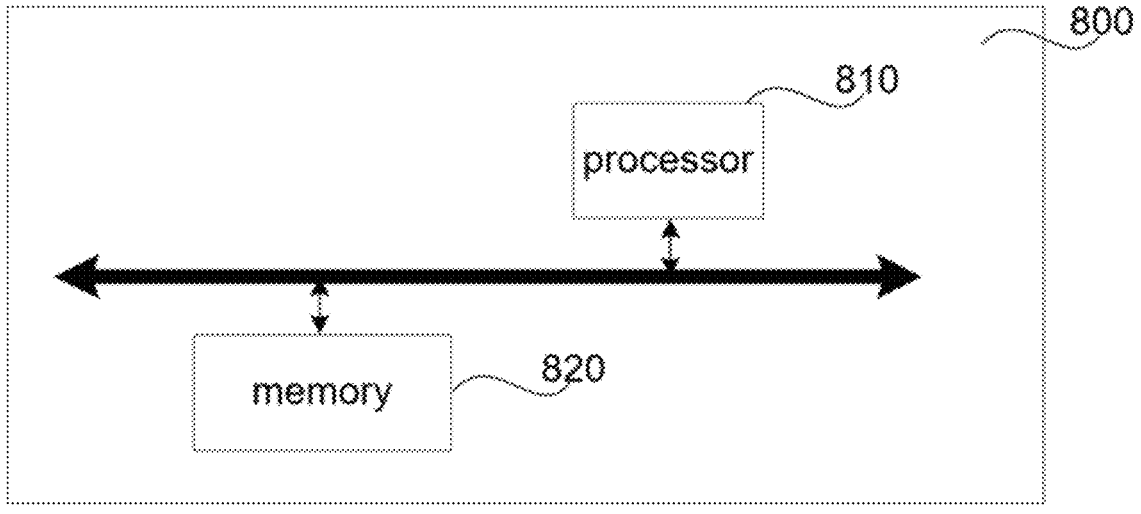
FIG. 8 is a block diagram of the structure of electronic equipment provided by the embodiment of the present disclosure.

Referring to FIG. 8, the embodiments of the present disclosure also provide electronic equipment 800 that can serve as the subject of performing the previously described image dynamic range compression method, comprising processor 810 and memory 820, wherein the memory 820 stores instructions that are executable by the processor 810, and the instructions are executed by the processor 810 to enable the processor 810 to execute the image denoising method in the preceding embodiments.

The processor 810 and the memory 820 can be connected via a communication bus, or via some communication module, for example, wireless communication modules, Bluetooth communication modules, Wi-Fi communication modules, and communication modules such as 2G (second-generation mobile communication technology), 3G (third-generation mobile communication technology), 4G (fourth-generation mobile communication technology), and 5G (fifth-generation mobile communication technology), etc.

The processor 810 can be an integrated circuit chip with signal processing capability. Processor 810 can be a general-purpose processor, including CPU (Central Processing Unit), NP (Network Processor), etc.; it can also be a digital signal processor, a dedicated integrated circuit, a field-programmable gate array or other programmable logic devices, a discrete gate or transistor logic device, or a discrete hardware component. It can implement or perform each of the methods, steps, and logical block diagrams disclosed in the embodiment of the present disclosure. The general-purpose processor can be a microprocessor, or the processor can also be any conventional processor, and so on.

Memory 820 can include but is not limited to RAM (Random Access Memory), ROM (Read Only Memory), PROM (Programmable Read-Only Memory), EPROM (Erasable Programmable Read-Only Memory), EEPROM (Electric Erasable Programmable Read-Only Memory), etc.

It is understood that the electronic equipment 800 can also include more general modules required by itself, which are not described in the embodiment of the present disclosure.

In addition, the embodiments of the present disclosure further provide a computer-readable storage medium having a computer program stored on the computer storage medium. The computer program, when run by the computer, performs the steps of the image denoising method as in the above embodiment.

In the embodiments provided in the present disclosure, it should be understood that the devices, and methods disclosed, can be implemented in other ways. The above-described embodiments of the device are merely schematic, for example, the division of the units described, which is only a logical functional division, can be divided in another way when actually implemented; for another example, multiple units or components can be combined or can be integrated into another system, or some features can be ignored, or not implemented. On another point, the mutual coupling or direct coupling or communication connection shown or discussed herein can be an indirect coupling or communication connection through some communication interfaces, devices, or units, which can be electrical, mechanical or in other forms.

In addition, the units illustrated as separate components can/cannot be physically separated, and the components displayed as units can/cannot be physical units, i.e., they can be located in one place or distributed to a plurality of network units. Some or all of these units can be selected according to actual needs to achieve the objective of the solution of the embodiments.

Further, each functional module in each embodiment of the present disclosure can be integrated together to form a separate part, or each module may exist separately, or two or more modules may be integrated to form a separate part.

It should be noted that functionality can be stored in a computer-readable storage medium if implemented as a software function module and sold or used as a standalone product. It is understood that the essence of technical solution of the present disclosure or the part that contributes to the prior art or the part of the technical solution may be embodied in the form of a software product. The computer software product is stored in a storage medium comprising a number of instructions to cause a computer device (which may be a personal computer, a server, or a network device, etc.) to perform all or some of the steps of the method described in various embodiments of the present disclosure. All or some of the steps of the method are described in various embodiments of the present disclosure. The aforementioned storage media comprises various media that can store program codes, such as USB flash drives, mobile hard drives, Read-Only Memory (ROM), Random Access Memory (RAM), diskettes, or compact discs.

In this context, relationship terms such as first and second are used only to distinguish one entity or operation from another entity or operation, without necessarily requiring or implying any such actual relationship or order between those entities or operations.

The above is only an embodiment of the present disclosure, which is not intended to limit the scope of protection of the present disclosure, and the present disclosure can have various changes and variations for those skilled in the art. Any modification, equivalent substitution, improvement, etc. made within the spirit and principles of the present disclosure shall be included in the scope of protection of the present disclosure.

What is claimed is:

1. An image denoising method, wherein the method comprises:

performing a variance-stabilizing transform on a to-be-denoised image based on preset noise model parameters to obtain a first intermediate image;

denoising the first intermediate image based on a preset signal-to-noise fluctuation curve and a preset denoising algorithm to obtain a second intermediate image, wherein the signal-to-noise fluctuation curve is used to characterize differential information in a noise variance corresponding to the to-be-denoised image at different exposure gains; and performing a variance-stabilizing inverse transform on the second intermediate image based on the noise model parameters to obtain a denoised image;

before the performing a variance-stabilizing transform on a to-be-denoised image based on preset noise model parameters to obtain a first intermediate image, the method further comprises:

obtaining multiple groups of sample images captured by an image sensor at different exposure gains, wherein the image sensor is an image sensor that captures the to-be-denoised image, and each group of sample images corresponds to one exposure gain; and determining the noise model parameters based on the multiple groups of sample images and a preset noise model;

the determining the noise model parameters based on the multiple groups of sample images and a preset noise model comprises:

denoising each group of sample images separately to obtain each group of denoised sample images;

determining, for each group of sample images, a noise variance of the group of sample images according to the group of sample images and their corresponding denoised sample images, and determining, according to the group of sample images and their corresponding noise variance, a first parameter and a second parameter which are corresponded to the group of sample images;

determining a first hyperparameter and a second hyperparameter of the noise model according to a photosensibility of each group of sample images, the first parameter and the second parameter corresponding to each group of sample images; and determining the noise model parameters based on a reference photosensibility of the to-be-denoised image, the first hyperparameter, and the second hyperparameter.

2. The method according to claim 1, wherein the multiple groups of sample images are obtained by using the image sensor with different exposure gains to photograph a gray plate in a preset environment.

3. The method according to claim 1, wherein the reference photosensibility of the to-be-denoised image is a photosensibility corresponding to a longest exposure frame in the to-be-denoised image.

4. The method according to claim 1, wherein the denoising the first intermediate image based on a preset signal-to-noise fluctuation curve and a preset denoising algorithm to obtain a second intermediate image comprises:

determining a similarity of each pixel point to its neighboring pixel points in the first intermediate image;

correcting the similarity according to the signal-to-noise fluctuation curve to obtain a corrected similarity of each pixel point; and denoising each pixel point according to the corrected similarity of each pixel point and the preset denoising algorithm, to obtain the second intermediate image.

5. An image denoising method, wherein the method comprises:

performing a variance-stabilizing transform on a to-be-denoised image based on preset noise model parameters to obtain a first intermediate image;

denoising the first intermediate image based on a preset signal-to-noise fluctuation curve and a preset denoising algorithm to obtain a second intermediate image, wherein the signal-to-noise fluctuation curve is used to characterize differential information in a noise variance corresponding to the to-be-denoised image at different exposure gains; and performing a variance-stabilizing inverse transform on the second intermediate image based on the noise model parameters to obtain a denoised image;

before the denoising the first intermediate image based on a preset signal-to-noise fluctuation curve and a preset denoising algorithm to obtain a second intermediate image, the method further comprises:

obtaining exposure information in the to-be-denoised image, wherein the exposure information comprises an exposure gain and an exposure duration that correspond to each of multiple independent exposures;

determining respective exposure ratios according to the exposure gain and the exposure duration corresponding to each of individual independent exposures; and determining the signal-to-noise fluctuation curve according to an exposure ratio corresponding to each of the individual independent exposures.

6. The method according to claim 5, wherein the determining respective exposure ratios according to the exposure gain and the exposure duration corresponding to each of individual independent exposures comprises:

determining an exposure ratio corresponding to each independent exposure according to a formula: $Ratio_i=(exp_i\times gain_i)/(EXP\times GAIN)$, where $Ratio_i$ is an exposure ratio corresponding to an ith independent exposure, $exp_i$ is an exposure duration corresponding to the ith independent exposure, $gain_i$ is an exposure gain corresponding to the ith independent exposure, EXP is an exposure duration of a reference exposure, and GAIN is an exposure gain corresponding to the reference exposure.

7. An electronic equipment, comprising: a processor and a memory, wherein the memory stores program instructions executable by the processor, and the processor calls the program instructions, so as to execute the method according to claim 1.

8. The electronic equipment according to claim 7, wherein before the performing a variance-stabilizing transform on a to-be-denoised image based on preset noise model parameters to obtain a first intermediate image, the method further comprises:

obtaining multiple groups of sample images captured by an image sensor at different exposure gains, wherein the image sensor is an image sensor that captures the to-be-denoised image, and each group of sample images corresponds to one exposure gain; and determining the noise model parameters based on the multiple groups of sample images and a preset noise model.

9. The electronic equipment according to claim 8, wherein the multiple groups of sample images are obtained by using the image sensor with different exposure gains to photograph a gray plate in a preset environment.

10. The electronic equipment according to claim 8, wherein the determining the noise model parameters based on the multiple groups of sample images and a preset noise model comprises:

denoising each group of sample images separately to obtain each group of denoised sample images;

determining, for each group of sample images, a noise variance of the group of sample images according to the group of sample images and their corresponding denoised sample images, and determining, according to the group of sample images and their corresponding noise variance, a first parameter and a second parameter which are corresponded to the group of sample images;

determining a first hyperparameter and a second hyperparameter of the noise model according to a photosensibility of each group of sample images, the first parameter and the second parameter corresponding to each group of sample images; and determining the noise model parameters based on a reference photosensibility of the to-be-denoised image, the first hyperparameter, and the second hyperparameter.

11. The electronic equipment according to claim 10, wherein the reference photosensibility of the to-be-denoised image is a photosensibility corresponding to a longest exposure frame in the to-be-denoised image.

12. The electronic equipment according to claim 7, wherein before the denoising the first intermediate image based on a preset signal-to-noise fluctuation curve and a preset denoising algorithm to obtain a second intermediate image, the method further comprises:

obtaining exposure information in the to-be-denoised image, wherein the exposure information comprises an exposure gain and an exposure duration that correspond to each of multiple independent exposures;

determining respective exposure ratios according to the exposure gain and the exposure duration corresponding to each of individual independent exposures; and determining the signal-to-noise fluctuation curve according to an exposure ratio corresponding to each of the individual independent exposures.

13. A non-transitory computer-readable storage medium, wherein the computer-readable storage medium is stored with computer program instructions thereon, and the computer program instructions, when read and run by a computer, performs the method according to claim 1.

14. The non-transitory computer-readable storage medium according to claim 13, wherein before the performing a variance-stabilizing transform on a to-be-denoised image based on preset noise model parameters to obtain a first intermediate image, the method further comprises:

obtaining multiple groups of sample images captured by an image sensor at different exposure gains, wherein the image sensor is an image sensor that captures the to-be-denoised image, and each group of sample images corresponds to one exposure gain; and determining the noise model parameters based on the multiple groups of sample images and a preset noise model.

15. The non-transitory computer-readable storage medium according to claim 14, wherein the multiple groups of sample images are obtained by using the image sensor with different exposure gains to photograph a gray plate in a preset environment.

16. The non-transitory computer-readable storage medium according to claim 14, wherein the determining the noise model parameters based on the multiple groups of sample images and a preset noise model comprises:

denoising each group of sample images separately to obtain each group of denoised sample images;

determining, for each group of sample images, a noise variance of the group of sample images according to the group of sample images and their corresponding denoised sample images, and determining, according to the group of sample images and their corresponding noise variance, a first parameter and a second parameter which are corresponded to the group of sample images;

determining a first hyperparameter and a second hyperparameter of the noise model according to a photosensibility of each group of sample images, the first parameter and the second parameter corresponding to each group of sample images; and determining the noise model parameters based on a reference photosensibility of the to-be-denoised image, the first hyperparameter, and the second hyperparameter.

17. The non-transitory computer-readable storage medium according to claim 16, wherein the reference photosensibility of the to-be-denoised image is a photosensibility corresponding to a longest exposure frame in the to-be-denoised image.

18. The non-transitory computer-readable storage medium according to claim 13, wherein before the denoising the first intermediate image based on a preset signal-to-noise fluctuation curve and a preset denoising algorithm to obtain a second intermediate image, the method further comprises:

obtaining exposure information in the to-be-denoised image, wherein the exposure information comprises an exposure gain and an exposure duration that correspond to each of multiple independent exposures;

determining respective exposure ratios according to the exposure gain and the exposure duration corresponding to each of individual independent exposures; and determining the signal-to-noise fluctuation curve according to an exposure ratio corresponding to each of the individual independent exposures.

\* \* \* \* \*